United States Patent [19]

Lammiman et al.

[11] 4,316,505
[45] Feb. 23, 1982

[54] PUMPING OF AQUEOUS SLURRIES

[76] Inventors: Steven A. Lammiman, Rua Ministro de Godoi, 628 - Perdizes - SP, Brazil; Michael P. Hardman, 36 Shrublands Rd., Berkhamsted, Herts., England

[21] Appl. No.: 111,429

[22] Filed: Jan. 11, 1980

[30] Foreign Application Priority Data

Jan. 12, 1979 [GB] United Kingdom ............... 01166/79

[51] Int. Cl.³ ............................................. E21B 33/13
[52] U.S. Cl. ............................... 166/293; 260/29.6 H; 406/49
[58] Field of Search ................. 260/29.6 H, 29.6 HN, 260/29.6 M; 166/293; 406/47, 49; 137/13; 405/264, 265, 266, 267; 252/312

[56] References Cited

U.S. PATENT DOCUMENTS

| | | | |
|---|---|---|---|
| 2,775,557 | 12/1956 | Morgan | 260/29.6 H |
| 3,312,506 | 4/1967 | Baker | 406/49 |
| 3,338,320 | 8/1967 | Gilson | 260/29.6 H |
| 3,380,947 | 4/1968 | Galgoczi | 260/29.6 H |
| 3,447,608 | 6/1969 | Fry | 166/293 |
| 3,838,047 | 9/1974 | Le Blanc | 260/29.6 H |
| 3,842,013 | 10/1974 | Booth | 406/49 |
| 3,865,547 | 2/1975 | Titus | 406/49 |
| 4,169,824 | 10/1979 | Kane | 260/29.6 M |
| 4,175,066 | 11/1979 | Shibazaki | 260/29.6 M |

Primary Examiner—Paul R. Michl
Attorney, Agent, or Firm—Caesar, Rivise, Bernstein & Cohen Ltd.

[57] ABSTRACT

To improve the pumpability of aqueous slurries of mineral dusts, e.g. coal tailings, and cement, there is added a dispersing agent comprising a copolymer of a hydrophilic material and a relatively less hydrophilic material. A preferred dispersing agent is a water-soluble copolymer of polyacrylic acid and polymethacrylic acid.

3 Claims, 1 Drawing Figure

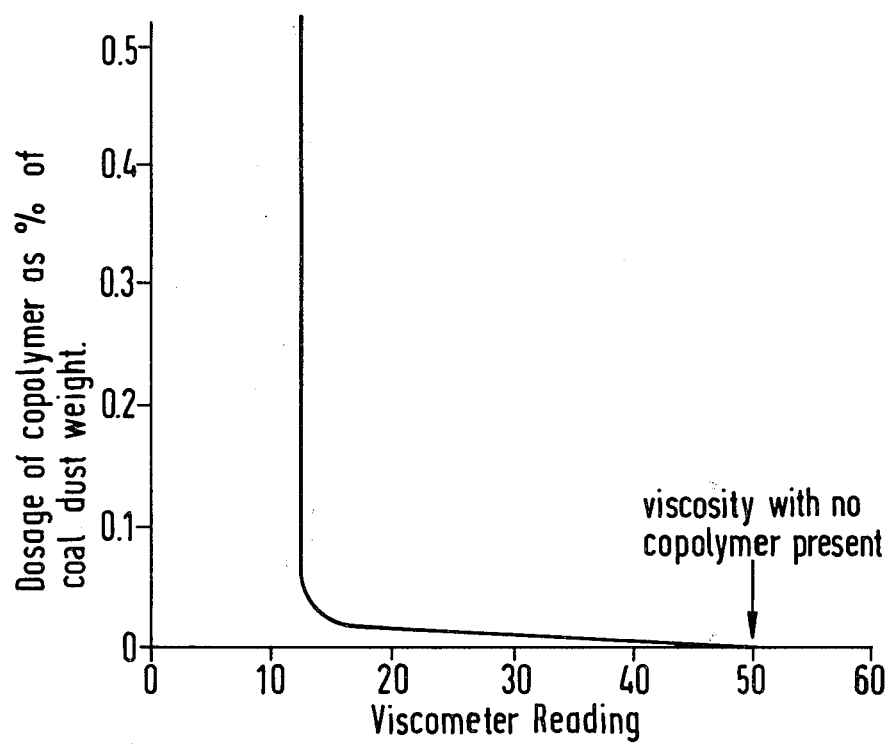

PUMPING OF AQUEOUS SLURRIES

The invention relates to the pumping of aqueous slurries and in particular to a method of improving the pumping properties of an aqueous slurry of a finely-divided mineral such as coal dust.

In the coal mining industry, coal lumps removed from a mine are often washed with water to remove coal dust particles known as tailings. The size of these particles ranges from 5 $\mu$m to 250 $\mu$m. One method of utilising the tailings is to pump them in an aqueous slurry back down the mine where the slurry is mixed with a special cement called Packbind cement and the mix is then used to seal disused mining tunnels.

One problem with this method of utilising the tailings is that the coal dust particles tend to settle out of the slurry which makes it difficult to pump the slurry. This problem is often made worse by the use of a flocculating agent in the washing process mentioned above, which makes the particles difficult to disperse by mechanical methods.

It has now been found that the pumping properties of an aqueous slurry of a finely-divided mineral such as coal dust, may be greatly improved by the addition to the slurry of a particular type of dispersing agent.

According to the invention there is provided a pumpable aqueous slurry of a finely-divided mineral such as coal dust, comprising the finely-divided mineral, water and a dispersing agent, the dispersing agent being a copolymer of a hydrophilic material and a relatively less hydrophilic material.

Whilst the mechanism by which the invention works is not fully understood, we have determined that this type of dispersing agent is considerably more effective in preventing settlement of the particles than other types of dispersing agent. It is believed that the presence of the less hydrophilic material enhances the dispersing power of the dispersing agent, possibly be exerting a steric effect on the copolymer.

The proportion of the less hydrophilic material in the copolymer is preferably between 5% and 50% by weight, a proportion of 20% being especially preferred.

An especially preferred dispersing agent is a water soluble copolymer of polyacrylic acid and polymethacrylic acid. The presence of methyl groups in the polymethacrylic acid renders this material less hydrophilic than polyacrylic acid. This copolymer is preferably used as a water soluble salt in the composition of the invention. The ratio of carboxyl groups to carbon atoms in the copolymer should be about 0.4 and the molecular weight of the copolymer should be between 7000 and 8000 to achieve the desired copolymer properties. This particular copolymer is especially preferred because of its excellent dispersing properties, in the composition of the invention, because of its ready availability and because this dispersing agent is effective in dosages which do not significantly increase the setting time of Packbind cement. The copolymer may conveniently be added to the slurry as a 20% wt/vol aqueous solution.

The preferred dosage range of dispersing agent is from 0.02% to 0.4% based on the weight of mineral dust present in the slurry. Below a dosage of 0.02% the dispersing effect is greatly reduced. Above a dosage of 0.4% the dispersing agent tends to increase the setting time of Packbind cement to an unacceptable extent. A dosage range of 0.1% to 0.2% calculated on the above basis, is convenient.

The invention includes a pumpable aqueous slurry as described above, which includes Packbind cement and, according to a different aspect, the invention also includes a method of pumping an aqueous slurry of a finely-divided mineral, comprising adding to the slurry an aqueous solution of the dispersing agent and then pumping the slurry along a duct.

The invention is illustrated below in Examples 1 and 2.

EXAMPLE 1

A solution of a dispersing agent was prepared by dissolving in water the sodium salt of a copolymer of 80% polyacrylic acid and 20% polymethacrylic acid, to give a 20% wt/vol solution. The copolymer had a molecular weight of between 7000 and 8000 and the ratio of carboxyl groups to carbon atoms in the copolymer was about 0.4.

An aqueous slurry of coal dust was prepared and then divided into a number of portions. The portions were then mixed with the solution of dispersing agent in dispersing agent dosages of between 0.01% and 0.5% based on the weight of coal dust. The viscosity of each portion was then measured on a Brookfield viscometer using a Helipath Spindle TA at speed 10. The results obtained are shown in the accompanying graph.

The results show that for dosages of between about 0.05% and 0.5%, a 75% reduction in the viscosity of the slurry was obtained compared with the viscosity of the slurry with no dispersing agent present, indicating an improvement in pumping properties of the slurry. The particles did not settle out of the slurry on standing.

Similar tests with other dispersing agents not being copolymers of the type described, failed to achieve the same results.

EXAMPLE 2

In a further evaluation, the solution of dispersing agent used in Example 1 was added to an aqueous Packbind cement grout having a water/cement ratio of 0.35, in a dosage of 0.12% of copolymer based on the weight of cement. As a control, a sample of the same grout containing no copolymer was used. Both sample grouts were allowed to cure at 20° C. until the final set was attained, as defined in BS. 5075, for a resistance of 3.5 N/mm$^2$ to 25 mm penetration. The setting time of both grout samples was measured and is shown in the following table:

| Dosage of copolymer as percentage of Packbind cement weight | Setting time (minutes) |
|---|---|
| 0 | 26 |
| 0.12 | 28 |

The results clearly show that the effect of a dosage of 0.12% of copolymer on the setting time of Packbind cement was negligible.

Further tests using mixtures of polyacrylic acid and polymethacrylic acid, and using terpolymers of these two materials showed that these were not as effective in dispersing coal dust particles in aqueous solution as was a copolymer of the type described above.

Without further elaboration the foregoing will so fully illustrate my invention that others may, by applying current or future knowledge, readily adapt the same for use under various conditions of service.

We claim:

1. A method for the sealing of a disused mining tunnel involving mineral dust produced during mining, said method comprising the step of forming a pumpable aqueous slurry of the mineral, water, cement and a dispersing agent comprising a copolymer of a hydrophilic material and a less hydrophilic material, said less hydrophilic material being present in the copolymer in an amount between 5 and 50% by weight, the ratio of carboxyl groups to carbon atoms in the copolymer being about 0.4 and the molecular weight of the copolymer is 7000 and 8000 to achieve the desired copolymer properties, said dispersing agent being a water soluble copolymer of polyacrylic acid and polymethacrylic acid, and then pumping the slurry into the mine and allowing it to set there.

2. The method of claim 1, in which the cement is a packbind cement.

3. The method of claim 1, in which the slurry is a flocculating agent present from washing of the coal tailings.

* * * * *